(12) United States Patent
Ijaz et al.

(10) Patent No.: US 8,056,928 B2
(45) Date of Patent: Nov. 15, 2011

(54) VEHICLE AND FUEL STORAGE SYSTEM FOR A VEHICLE

(75) Inventors: Mujeeb Ijaz, Ypsilanti, MI (US); Dale Leanhardt, Plymouth, MI (US); Mike Veenstra, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1234 days.

(21) Appl. No.: 11/718,040

(22) PCT Filed: Oct. 28, 2005

(86) PCT No.: PCT/US2005/038956
§ 371 (c)(1),
(2), (4) Date: Apr. 26, 2007

(87) PCT Pub. No.: WO2006/057765
PCT Pub. Date: Jun. 1, 2006

(65) Prior Publication Data
US 2009/0133948 A1     May 28, 2009

Related U.S. Application Data

(60) Provisional application No. 60/623,255, filed on Oct. 29, 2004.

(51) Int. Cl.
*B60P 3/22* (2006.01)
(52) U.S. Cl. .................................. 280/830; 280/834
(58) Field of Classification Search .................. 180/65.1, 180/65.31; 280/830, 831, 834
See application file for complete search history.

(56) References Cited

U.S. PATENT DOCUMENTS

| 3,177,025 | A | * | 4/1965 | Short | 294/33 |
| 3,615,848 | A | * | 10/1971 | Sibenhorn | 429/442 |
| 3,830,326 | A | * | 8/1974 | Hartung | 180/305 |

(Continued)

FOREIGN PATENT DOCUMENTS

EP    0067651 A1    12/1982

(Continued)

OTHER PUBLICATIONS

Mujeeb I. Ijaz, "Hydrogen Energy Systems in Future Fuel Cell Electric Vehicles", Fuel Cell Vehicles, Proceedings of the 17th International Electric Vehicle Symposium, Montreal, Canada, Oct. 2000, 17 pages.

*Primary Examiner* — Paul N Dickson
*Assistant Examiner* — Tashiana Adams
(74) *Attorney, Agent, or Firm* — David B. Kelley; Brooks Kushman P.C.

(57) ABSTRACT

A vehicle and a fuel storage system for a vehicle are provided. A frame defining a perimeter structure and having first and second ends, and a generally open central interior portion, is configured to receive any one of a plurality of vehicle bodies in a body-on-frame vehicle architecture. A fuel cell arrangement is disposed adjacent one end of the frame, and a fuel storage tank is disposed in the central interior portion of the frame, along a length of the frame. The fuel storage tank provides a source of fuel for the fuel cell, and also acts as a fuel delivery conduit from one end of the frame to the other. The fuel storage system can include a non-rigid mounting structure for the fuel tank, thereby substantially isolating the fuel tank from movements of the vehicle frame.

19 Claims, 4 Drawing Sheets

U.S. PATENT DOCUMENTS

| | | | | |
|---|---|---|---|---|
| 3,884,255 | A * | 5/1975 | Merkle | 137/265 |
| 4,016,836 | A * | 4/1977 | MacKay et al. | 123/3 |
| 4,211,537 | A * | 7/1980 | Teitel | 48/191 |
| 4,223,899 | A | 9/1980 | Krieger | |
| 4,457,525 | A * | 7/1984 | Tanaka et al. | 280/834 |
| 4,523,548 | A * | 6/1985 | Engel et al. | 123/1 A |
| 5,323,953 | A * | 6/1994 | Adderley et al. | 228/157 |
| 5,370,418 | A * | 12/1994 | Pugh | 280/830 |
| 5,443,578 | A * | 8/1995 | Davis, Jr. | 280/834 |
| 5,641,031 | A * | 6/1997 | Riemer et al. | 429/423 |
| 5,673,939 | A * | 10/1997 | Bees et al. | 280/831 |
| 5,908,077 | A * | 6/1999 | Moore | 180/65.25 |
| 6,013,385 | A * | 1/2000 | DuBose | 429/410 |
| 6,378,637 | B1 * | 4/2002 | Ono et al. | 180/65.31 |
| 6,527,075 | B1 * | 3/2003 | Izuchukwu et al. | 180/69.5 |
| 6,536,722 | B2 * | 3/2003 | Sadowski et al. | 248/154 |
| 6,676,159 | B1 * | 1/2004 | Sellergren | 280/783 |
| 6,692,028 | B2 * | 2/2004 | Koster | 280/830 |
| 6,736,229 | B1 | 5/2004 | Amori et al. | |
| 6,827,371 | B2 * | 12/2004 | Greil | 280/834 |
| 6,830,114 | B2 * | 12/2004 | Hammonds | 180/6.2 |
| 6,923,282 | B2 * | 8/2005 | Chernoff et al. | 180/65.22 |
| 6,983,945 | B2 * | 1/2006 | Kawasaki et al. | 280/834 |
| 7,108,091 | B2 * | 9/2006 | Guidry et al. | 180/68.1 |
| 7,137,474 | B2 * | 11/2006 | Yokote | 180/314 |
| 7,232,156 | B2 * | 6/2007 | Rife et al. | 280/834 |
| 7,292,992 | B2 * | 11/2007 | Chernoff et al. | 705/26.1 |
| 7,303,211 | B2 * | 12/2007 | Borroni-Bird et al. | 280/831 |
| 7,533,904 | B2 * | 5/2009 | Koike et al. | 280/834 |
| 7,841,624 | B2 * | 11/2010 | Kobayashi et al. | 280/834 |
| 2002/0171236 | A1 * | 11/2002 | Joitescu et al. | 280/834 |
| 2003/0006349 | A1 | 1/2003 | Sadowski et al. | |
| 2003/0062204 | A1 * | 4/2003 | Kato et al. | 180/65.1 |
| 2003/0146214 | A1 | 8/2003 | Idoguchi | |
| 2004/0060750 | A1 | 4/2004 | Chernoff et al. | |
| 2004/0069545 | A1 | 4/2004 | Chernoff et al. | |
| 2004/0069556 | A1 | 4/2004 | Chernoff et al. | |
| 2004/0173391 | A1 * | 9/2004 | Amori et al. | 180/65.1 |
| 2005/0046170 | A1 * | 3/2005 | Uhara et al. | 280/834 |
| 2005/0161934 | A1 * | 7/2005 | Rife et al. | 280/831 |
| 2006/0061080 | A1 * | 3/2006 | Luttinen et al. | 280/784 |
| 2009/0322068 | A1 * | 12/2009 | Hofner | 280/834 |

FOREIGN PATENT DOCUMENTS

| | | |
|---|---|---|
| JP | 04368227 | 12/1992 |
| WO | 02078993 A1 | 10/2002 |

* cited by examiner

VEHICLE AND FUEL STORAGE SYSTEM FOR A VEHICLE

CROSS-REFERENCE TO RELATED APPLICATIONS

This application claims the benefit of U.S. Provisional Application Ser. No. 60/623,255, filed Oct. 29, 2004.

BACKGROUND OF THE INVENTION

1. Field of the Invention

The present invention relates to a vehicle and fuel storage system for a vehicle.

2. Background Art

As non-conventional vehicles, such as hybrid electric vehicles (HEVs) and fuel cell vehicles (FCVs), begin to gain acceptance, vehicle designers are trying to provide some of the same features in these new vehicles that drivers have come to expect from conventional vehicles. For example, if a vehicle cannot travel more than 300 miles prior to needing to be refueled, it may not be accepted by the average consumer. In the case of FCV's, designers have been challenged to provide storage for enough fuel to ensure that the vehicle can travel 300 miles or more without refueling.

At some level, all designs require addressing competing interests. For example, in the case of increasing the size of a fuel storage system in a vehicle, it is necessary to consider the impact of such an increase on passenger room and comfort, and storage space. An example of a vehicle body integrating a hydrogen fuel tank is described in U.S. Patent Application Publication No. 2005/0161934 published on Jul. 28, 2005 (Rife et al.). Rife et al. describes a vehicle frame that includes a floor pan having a centrally positioned tunnel extending the length of the frame, and a fuel tank integrated into the central tunnel. Rife et al. describes an increase in the stiffness of the chassis which results from a larger tunnel, the size of which has been increased to accommodate the fuel tank.

One limitation of the vehicle frame described in Rife et al. is that each different body style must be modified to create a tunnel large enough to accommodate the fuel storage tank. This issue is indicative of unibody construction, in which each vehicle body is formed to meet both the aesthetic and structural requirements of the vehicle. This is in contrast to a body-on-frame architecture, in which many of the structural elements of the body are found in a chassis that is configured to accommodate any of a number of vehicle bodies, thereby making it useful across a number of vehicle platforms. Another limitation of the vehicle frame described in Rife et al. is that configuring the tunnel to accommodate the storage tank necessarily increases the stiffness of the body, which detracts from options available to the vehicle designer.

Therefore, it would be desirable to have a fuel storage system for a vehicle that includes a fuel storage tank, and in particular, one capable of storing a compressed gas, that is large enough so the vehicle can travel a long distance before needing to be refueled. In addition, it would be desirable to have a fuel storage system that does not require the vehicle body to be changed in order to accommodate a fuel storage tank. It would also be desirable to have a vehicle having a fuel storage system that does not dictate the stiffness of the vehicle body.

SUMMARY OF THE INVENTION

One advantage of the present invention is that it provides a fuel storage system for a vehicle which is adaptable to a vehicle frame, such that any of a number of different bodies may be attached to the frame without undergoing changes to the body to accommodate the fuel storage system. This allows the same fuel storage system to be attached to one frame and used across multiple vehicle platforms.

Another advantage of the invention is that it provides a vehicle having a fuel storage system including a fuel storage tank capable of holding compressed hydrogen gas, wherein the vehicle can travel more than 300 miles prior to needing to be refueled.

A further advantage of the invention is that it provides a fuel storage system that does not unnecessarily increase the stiffness of the vehicle body, and thereby provides the vehicle designer greater flexibility in choosing the body design.

Another advantage of the invention is that it provides a fuel storage system that can utilize a single fuel storage tank, thereby providing a weight reduction over multiple tank systems.

The invention also provides a fuel storage system for a vehicle that includes a frame, including first and second opposing side rails, and first and second cross members disposed between the first and second side rails. The frame is configured to receive any one of a plurality of vehicle bodies, thereby forming a body-on-frame vehicle architecture. A single, generally cylindrical hydrogen fuel storage tank is disposed between the side rails along a length of the frame. A non-rigid mounting structure is used for attaching the tank to the frame. The mounting structure is configured to allow movement of the tank, thereby accounting for expansion and contraction of the tank as it is respectively pressurized and depressurized.

The invention further provides a fuel storage system for a vehicle that includes a frame defining a perimeter structure having first and second ends, and a generally open central interior portion. The frame is configured to receive any one of a plurality of vehicle bodies, thereby forming a body-on-frame vehicle architecture. A fuel storage tank is disposed in the central interior portion along a length of the frame. The tank includes first and second ends disposed adjacent respective ends of the frame. Each of the tank ends is configured to allow the passage of fuel therethrough, thereby allowing fuel input at one end of the tank, and fuel output at the other end of the tank, such that the tank forms a fuel delivery conduit along a length of the frame.

The invention also provides a vehicle including a fuel storage system. The vehicle includes a chassis defining a perimeter structure having first and second ends and a generally open central interior portion. The chassis is configured to receive any one of a plurality of vehicle bodies, thereby forming a body-on-frame vehicle architecture. A fuel cell arrangement is disposed adjacent the first end of the frame, and is operable to receive fuel and to output electrical energy. A fuel storage tank is disposed in the central interior portion along the length of the chassis for providing a source of fuel for the fuel cell. The tank includes a fuel output disposed adjacent the fuel cell arrangement, and a fuel input disposed adjacent the second end of the chassis. Thus, the tank forms a fuel delivery conduit along a length of the chassis.

DETAILED DESCRIPTION OF THE PREFERRED EMBODIMENT(S)

Figure 1A:
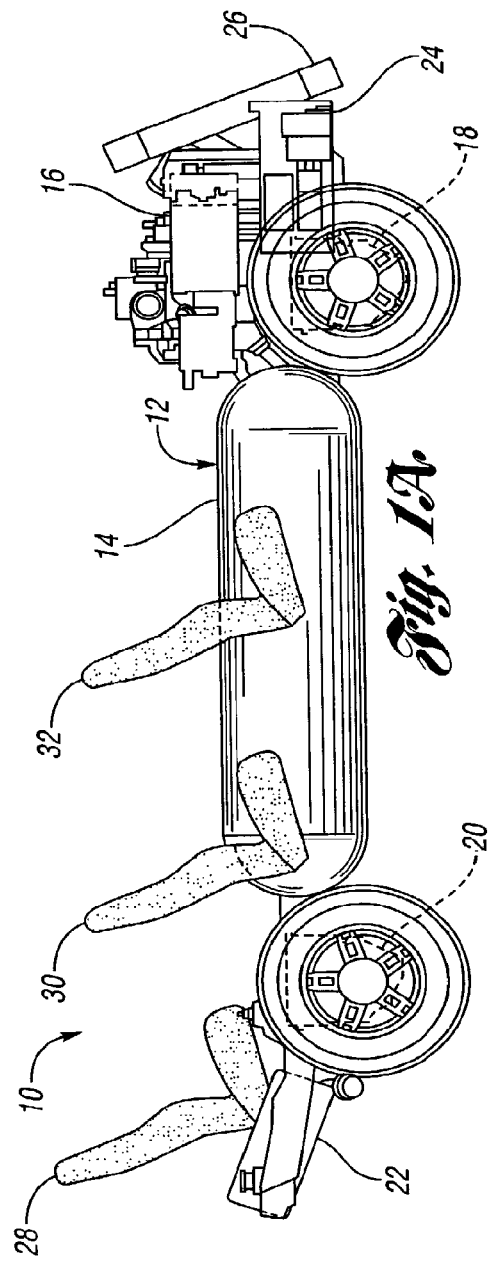
FIGS. 1A and 1B are side and top plan views, respectively, of a vehicle in accordance with the present invention.
Figure 1B:
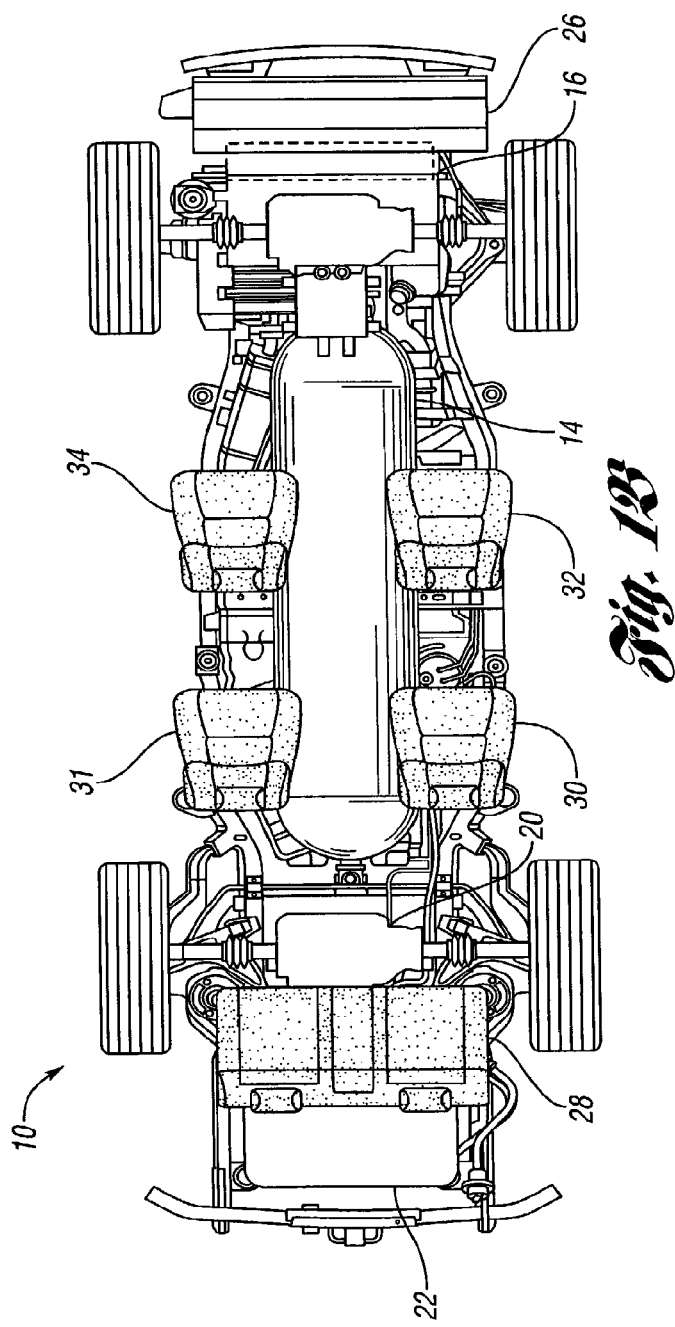

FIGS. 1A and 1B show a vehicle 10 in accordance with an embodiment of the present invention. The vehicle 10 is a fuel cell vehicle configured to use hydrogen gas as a fuel to generate electricity to propel the vehicle 10. As shown in FIG. 1A, the vehicle 10 includes a fuel storage system 12 having a large, generally cylindrical fuel tank 14. The fuel tank 14 is configured to hold compressed hydrogen gas, and in particular, is large enough to hold enough gas so that the vehicle 10 can travel more than 300 miles before needing to be refueled. The tank 14 supplies hydrogen gas to a fuel cell arrangement, or stack 16, located near the front of the vehicle 10. The fuel cell stack 16 uses the hydrogen gas supplied from the fuel tank 14, to generate electricity which can be used directly by front and rear electric transaxles 18, 20, or stored in a battery 22 for later use.

It is contemplated that the tank 14 will be large enough—e.g., 350-400 liters—to store 8-12 kg of compressed hydrogen fuel. Having a tank of this size helps to ensure that the vehicle 10 will be able to travel at least 300 miles without refueling, while at the same time, not adversely impacting trunk space, cargo capacity, rear seat height, or foot wells. Of course, different tank sizes may be used, and the storage capacity will depend not only on volume, but also on pressure. For example, at pressures greater than 5000 psi, it may be possible to store 8-12 kg of hydrogen fuel in a tank smaller than 350 liters. The present invention does, however, make it possible to use a relatively large fuel tank if desired.

The vehicle 10 also includes a compressor 24, which provides air to the fuel cell stack 16 to facilitate the electricity-producing reactions within the fuel cell stack 16. A heat exchanger 26 is used to cool the fuel cell stack 16. As shown in FIG. 1B, the fuel tank 14 is centrally located along a length of the vehicle 10. In a conventional vehicle, much of this space would be occupied by a transmission and a drive shaft, neither of which is present in the fuel cell vehicle 10. By placing the tank 14 down a central portion of the vehicle 10, the impact on passenger space and seating is minimized. In particular, the vehicle 10 is still able to accommodate three rows of seats, including a third row bench seat 28, second row bucket seats 30, 31, and front bucket seats 32, 34. Therefore, the vehicle 10 has the advantage of providing a large compressed gas storage tank to ensure a long driving range, while minimizing the adverse impact on passenger and cargo space.

Figure 2:
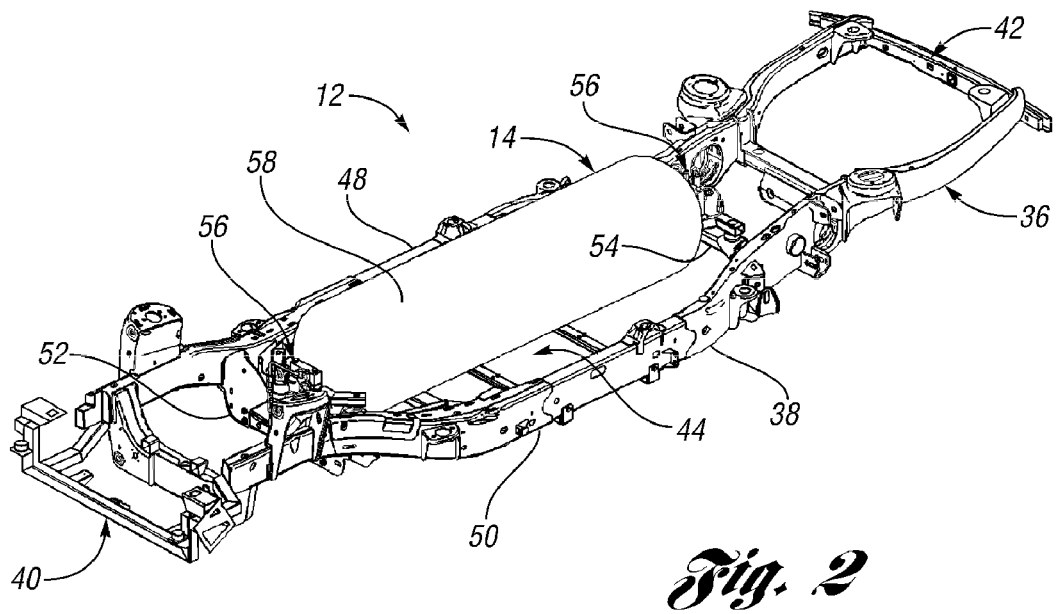
FIG. 2 is an isometric view of a fuel storage system in accordance with the present invention.
Figure 3:
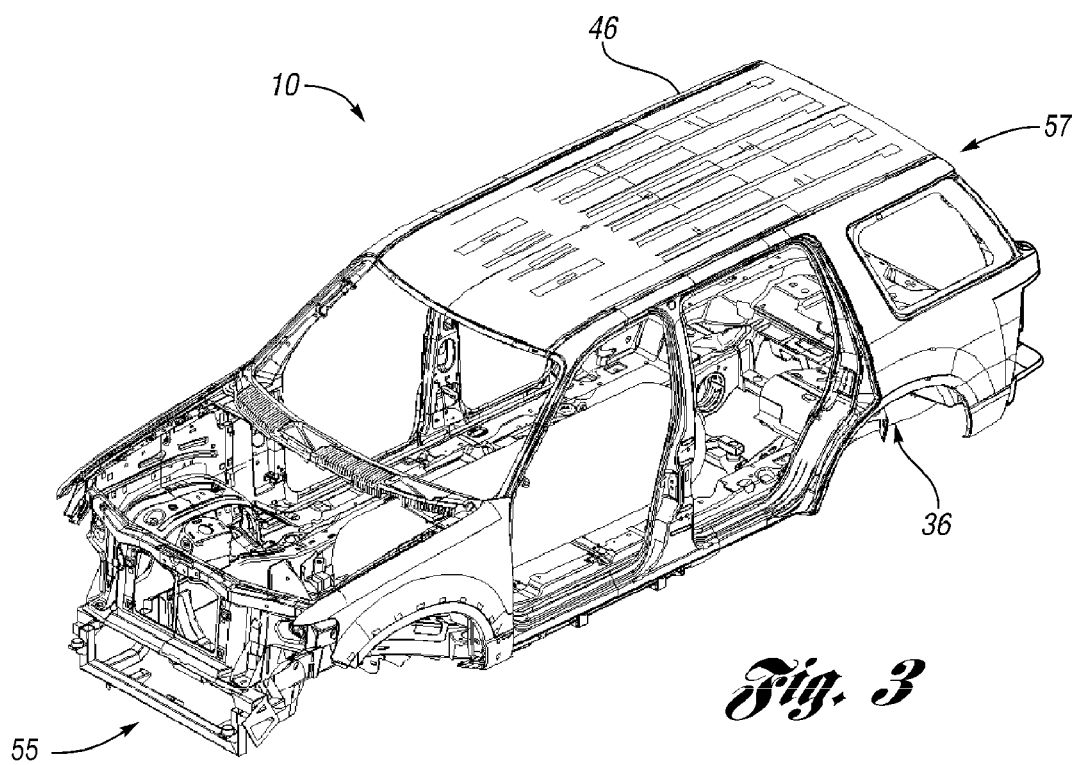
FIG. 3 is a partial fragmentary isometric view of the fuel storage system shown in FIG. 2, having a vehicle body attached thereto.

As may be discerned from FIGS. 1A and 1B, the vehicle 10 has a body-on-frame architecture, such that a single frame design can accommodate a plurality of different vehicle bodies. In FIG. 2, a chassis, or frame 36, of the vehicle 10 is shown in isolation with the fuel tank 14 and other elements of the storage system 12. As shown in FIG. 2, the frame 36 forms a perimeter structure 38 having first and second ends 40, 42, and a generally open central interior portion 44. As shown in FIG. 3, the frame 36 is configured to receive a vehicle body 46, and in particular, the frame 36 can receive any of a plurality of different styles of vehicle bodies, thereby adding flexibility of design to the vehicle 10. Returning to FIG. 2, it is shown that the frame 36 includes first and second opposing side rails 48, 50, and a number of cross members disposed between the first and second side rails 48, 50, the cross members including first and second cross members 52, 54.

With reference to FIGS. 2 and 3, a front 55 of the vehicle 10 and a rear 57 of the vehicle 10, generally correspond to first and second ends 40, 42 of the vehicle frame 36. The tank 14 can be secured to the frame 36 in any of a number of different ways. For example, in the embodiment shown in FIG. 2, the fuel storage system 12 includes a non-rigid mounting structure 56. As described in greater detail in FIGS. 4-7, the mounting structure 56 allows the tank 14 to be flexibly mounted to the frame 36 such that the tank 14 is secure, and yet may expand and contract as the tank 14 is pressurized and depressurized. The flexible mounting structure 56 also allows the tank 14 to be substantially isolated from movement of the frame 36 as it bends and twists while the vehicle 10 is in motion.

Figure 4:
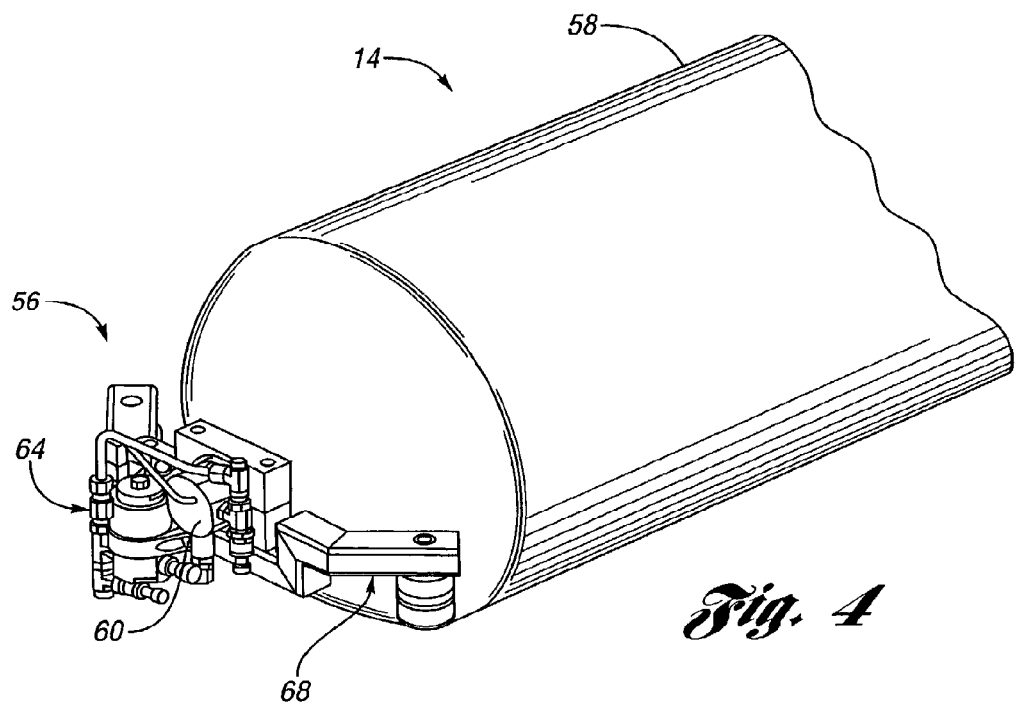
FIG. 4 is a partial fragmentary isometric view of a front portion of a fuel storage tank and mounting structure of the fuel storage system.
Figure 5:
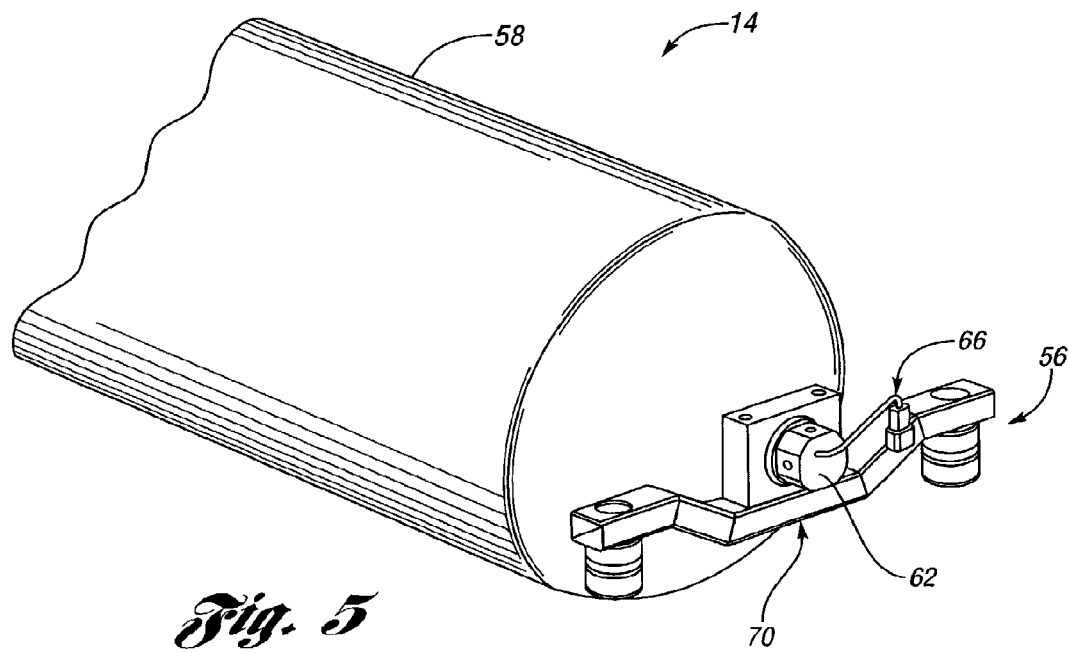
FIG. 5 is a partial fragmentary view of a rear portion of the fuel storage tank and mounting structure.

FIG. 4 shows a portion of the tank 14, and in particular, the portion oriented toward the front 55 of the vehicle 10. The tank 14 includes a middle portion 58 which has a generally constant diameter along most of the length of the tank 14. The tank 14 includes a first end, forming a first neck 60, having a much smaller diameter than the middle portion 58. With reference to FIG. 5, it is also shown that at the rear of the tank 14 is a second neck 62, also having a much smaller diameter than the middle portion 58 of the tank 14. Because the fuel cell stack 16—see FIGS. 1A and 1B—is oriented toward the front 55 of the vehicle 10, a fuel delivery system 64 is attached to the front end of the tank 14.

The fuel delivery system is configured to be attached to the fuel cell stack 16, and allows the pressurized hydrogen gas to be metered to the fuel cell stack 16 as required. Similarly, as shown in FIG. 5, a fuel receiving system 66 is located at the rear of the tank 14. The fuel receiving system 66 is configured to allow refueling of the tank 14 with pressurized hydrogen gas from a fuel source. By having both ends of the tank 14 configured to allow the gas to pass through them, the tank 14 acts as a fuel delivery conduit along a length of the vehicle 10. This configuration helps to eliminate additional fuel lines and/or conduits which would be necessary if the tank 14 were shorter, or if access to the interior of the tank 14 was exclusively through one end.

Figure 6:
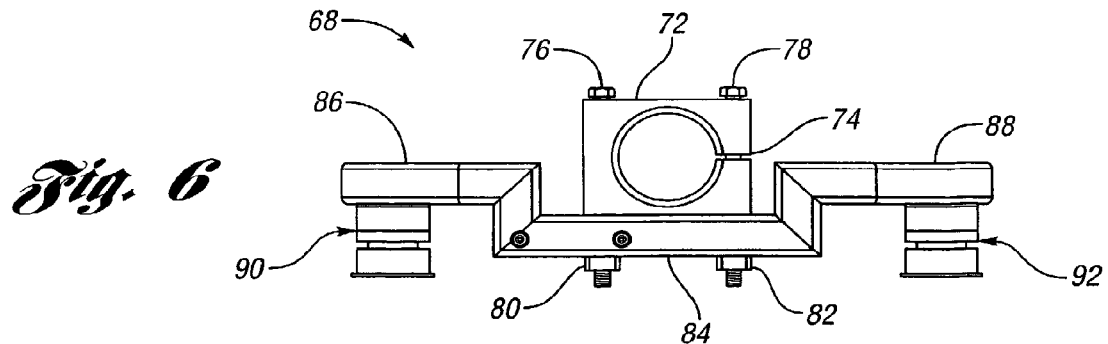
FIG. 6 is a front plan view of a portion of the mounting structure shown in FIG. 4.

As shown in FIGS. 4 and 5, the mounting structure 56 includes first and second portions 68, 70 respectively disposed at the front and rear ends of the tank 14. FIG. 6 shows the first portion 68 of the mounting structure 56 isolated from the tank 14. As shown in FIG. 6, the first portion 68 of the mounting structure 56 includes a circumferential portion, or mounting ring 72, which is configured to be disposed around the first neck 60—see FIG. 4.

The mounting ring 72 is configured as a split ring clamp, as evidenced by the slot 74. This configuration allows the mounting ring 72 to be securely tightened around the neck 60 of the tank 14. Bolts 76, 78, and respective nuts 80, 82, not only hold the mounting ring 72 to a bracket 84, but tightening the bolt 78 and nut 82, will also tighten the mounting ring 72 around the neck 60 of the tank 14. As noted above, the mounting structure 56 is a non-rigid mounting structure. To facilitate this type of attachment, the first portion 68, and in particular the bracket 84, includes a pair of elongate members, or extension members 86, 88, extending laterally outward from the mounting ring 72. Each of the extension members 86, 88 is configured for attachment to a portion of the frame 36 through a respective flexible mounting structure 90, 92.

The flexible mounting structures 90, 92 may include an elastomeric material, or other flexible material, which allows the bracket 84 to remain relatively stationary, as the frame 36 bends and twists. Each of the flexible mounting structures 90, 92 may be attached to the frame 36 through a nut and bolt configuration, similar to the one used on the mounting ring 72. The result of such a mounting configuration for the first portion 68 of the mounting structure 56 is that the tank 14 is inhibited from longitudinal movement near the front end, as the mounting ring 72 is securely locked around the first neck 60, and the bracket 84 is mounted to the frame 36. Because the tank 14 may expand both circumferentially and longitudinally when it is pressurized, the second portion 70 of the mounting structure 56 has a different configuration from the first portion 68.

Figure 7:
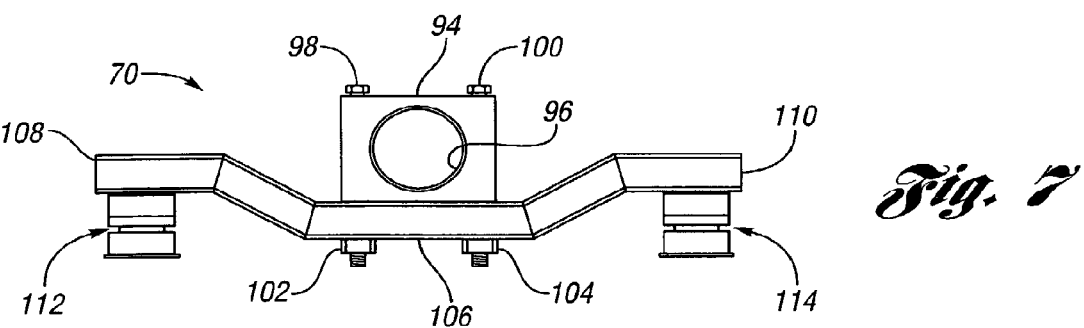
FIG. 7 is a front plan view of a portion of the mounting structure shown in FIG. 5.

Turning to FIG. 7, it is shown that the second portion 70 of the mounting structure 56 also includes a circumferential portion, or mounting ring 94. The mounting ring 94 is configured to receive the second neck 62 of the tank 14. Unlike the clamp 72, the mounting ring 94 is not configured for rigid attachment to the second neck 62. Rather, the second neck 62 merely protrudes through an aperture 96, which is large enough to allow longitudinal movement of the second neck 62. Thus, with the second portion 70 of the mounting structure 56, the bolts 98, 100 and the nuts 102, 104, merely hold the mounting ring 94 onto a bracket 106; they do not rigidly clamp the second neck 62.

The bracket 106 also includes two elongate members, or extension members 108, 110, extending laterally outward from the mounting ring 94. A comparison of FIG. 6 and FIG. 7 reveals that the brackets 84, 106 have slightly different configurations. Because of the way the frame 36 is configured, differences between the two brackets 84, 106 increase the efficiency of the overall package, and conserve space. Returning to FIG. 7, it is shown that the bracket 106 also includes flexible mounting structures 112, 114. Like their counterparts in the first portion 68, the flexible mounting structures 112, 114 on the second portion 70 can be made from an elastomeric material, or other flexible material, which allows the bracket 106 to remain relatively stationary as the frame 36 twists and bends. The bracket 106 may also be mounted to a portion of the frame 36 through bolts and nuts, or other fasteners, disposed through the flexible mounting structures 112, 114. As shown in FIG. 3, the mounting structure 56 includes no circumferential attachment around the middle portion 58 of the tank 14. This facilitates diametral movement, or circumferential expansion, of the tank 14 as it is pressurized.

Figure 8:
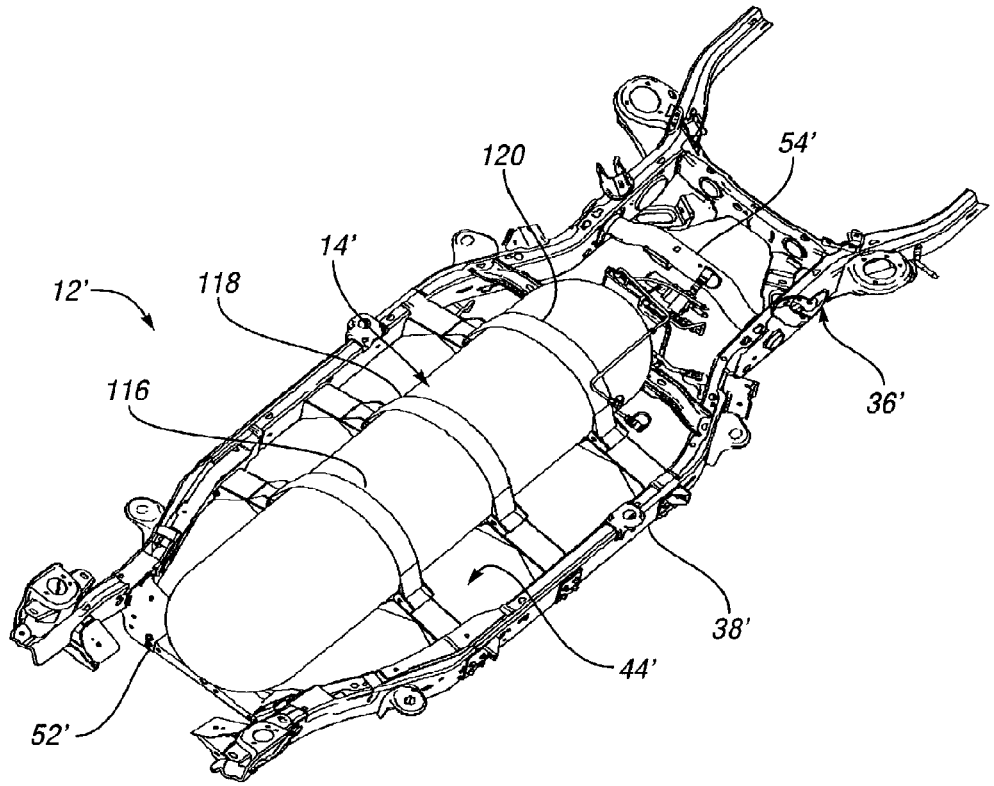
FIG. 8 shows a fuel storage system in accordance with another embodiment of the present invention, wherein a fuel storage tank is rigidly mounted to a vehicle frame.

FIG. 8 shows another embodiment of the invention, including a partial fragmentary view of a vehicle chassis, or frame 36'. The frame 36' is configured similarly to the frame 36 shown in FIG. 2; therefore, features of the frame 36' are labeled with numbers using the prime (') symbol to indicate like components. The frame 36' defines a perimeter structure 38', the ends of which are not shown in FIG. 8. The frame 36' includes a generally open central interior portion 44', having a fuel storage tank 14' disposed therein. Like the frame 36, the frame 36' is configured as part of a body-on-frame vehicle architecture, such that any of a plurality of different vehicle bodies can be mounted onto the frame 36'.

One obvious difference between the fuel storage system 12, shown in FIG. 2, and the fuel storage system 12', shown in FIG. 8, is the mounting of the fuel storage tanks 14, 14'. In particular, the tank 14' is mounted to the frame 36' using a rigid mounting structure that includes a plurality of hoop strap arrangements 116, 118, 120. The hoop strap arrangements are secured to the tank 14', and are also mounted to the frame 36', thereby acting as additional cross members. Of course, each of the hoop strap arrangements 116, 118, 120 is configured to allow for diametral expansion of the tank 14' when it is pressurized. Using the type of mounting structure shown in FIG. 8 adds stiffness to a vehicle frame, such as the frame 36'. This increased stiffness may be an advantage in some situations; however, as described above and shown in the other illustrations, the present invention also contemplates a non-rigid mounting structure which may not appreciably affect the rigidity of the vehicle frame. Therefore, the present invention provides flexibility with regard to the configuration of the fuel storage system and vehicle.

While the best mode for carrying out the invention has been described in detail, those familiar with the art to which this invention relates will recognize various alternative designs and embodiments for practicing the invention as defined by the following claims.

What is claimed:

1. A fuel storage system for a vehicle, comprising:
   a frame including first and second opposing side rails, and first and second cross members disposed between the first and second side rails, the frame being configured to receive any one of a plurality of vehicle bodies, thereby forming a body-on-frame vehicle architecture;
   a single, generally cylindrical hydrogen fuel storage tank disposed between the side rails along a length of the frame, the tank including first and second ends, each of the tank ends having a smaller diameter than a middle portion of the tank, thereby respectively forming first and second necks; and
   a non-rigid mounting structure for attaching the tank to the frame, the mounting structure being configured to allow movement of the tank, thereby accounting for expansion and contraction of the tank as it is respectively pressurized and depressurized,
   the mounting structure including a first portion including a split ring clamp securable around the first neck to inhibit longitudinal movement of the tank, and a second portion including a solid ring having an aperture sized to receive the second neck therethrough to facilitate longitudinal movement of the tank.

2. The fuel storage system of claim 1, wherein the first portion of the mounting structure includes a circumferential portion disposed around the first neck, and the second portion of the mounting structure includes a circumferential portion disposed around the second neck, the mounting structure being further configured to provide no circumferential attachment around the middle portion of the tank, thereby facilitating diametral movement of the tank.

3. The fuel storage system of claim 2, wherein the first and second portions of the mounting structure each include a pair of extension members laterally disposed from their respective circumferential portions, each of the extension members being attached to a portion of the frame.

4. The fuel storage system of claim 3, wherein at least one of the extension members of each of the first and second portions of the mounting structure includes a flexible attachment to a respective portion of the frame, thereby substantially isolating the tank from twisting and bending movements of the frame.

5. A fuel storage system for a vehicle, comprising:
a frame defining a perimeter structure having first and second ends and a generally open central interior portion, the frame being configured to receive any one of a plurality of vehicle bodies, thereby forming a body-on-frame vehicle architecture; and
a fuel storage tank disposed in the central interior portion along a length of the frame, the tank including first and second ends disposed adjacent respective ends of the frame, each of the tank ends being configured to allow the passage of fuel therethrough, thereby allowing fuel input at one of the tank ends and fuel output at the other of the tank ends such that the tank forms a fuel delivery conduit along a length of the frame.

6. The fuel storage system of claim 5, further comprising a mounting structure for attaching the tank to the frame, the mounting structure including first and second portions configured to respectively attach the first and second tank ends to the frame.

7. The fuel storage system of claim 6, wherein the mounting structure includes first and second portions, each of the first and second portions including a respective mounting ring and a pair of elongate members extending outwardly from the respective ring, each of the rings being configured for attachment to a respective tank end, and each of the elongate members being configured for attachment to a portion of the frame.

8. The fuel storage system of claim 7, wherein one of the rings inhibits lateral movement of the tank, and the other one of the rings facilitates lateral movement of the tank.

9. The fuel storage system of claim 8, wherein at least one of the elongate members of each of the first and second portions of the mounting structure includes a flexible attachment to the frame, thereby substantially isolating the tank from twisting and bending movements of the frame.

10. The fuel storage system of claim 9, wherein the tank includes a middle portion disposed between the tank ends, and
wherein the mounting structure includes only the first and second portions, thereby facilitating diametral expansion and contraction of the middle portion of the tank.

11. The fuel storage system of claim 5, further comprising a rigid mounting structure for attaching the tank to the frame such that the tank adds stiffness to the frame.

12. A vehicle including a fuel storage system, the vehicle comprising:
a chassis defining a perimeter structure having first and second ends and a generally open central interior portion, the chassis being configured to receive any one of a plurality of vehicle bodies, thereby forming a body-on-frame vehicle architecture;
a fuel cell arrangement disposed adjacent the first end of the chassis, the fuel cell arrangement being operable to receive fuel and to output electrical energy; and
a fuel storage tank disposed in the central interior portion along a length of the chassis for providing a source of fuel for the fuel cell, the tank including a fuel output disposed adjacent the fuel cell arrangement, and a fuel input disposed adjacent the second end of the chassis, the tank forming a fuel delivery conduit along a length of the chassis.

13. The vehicle of claim 12, wherein the tank is generally cylindrical, the vehicle further comprising a non-rigid mounting structure for attaching the tank to the chassis, the mounting structure being configured to allow longitudinal and diametral movement of the tank, thereby accounting for expansion and contraction of the tank as it is respectively pressurized and depressurized.

14. The vehicle of claim 13, wherein the tank includes first and second ends, each of the tank ends having a smaller diameter than a middle portion of the tank, thereby respectively forming first and second necks, and
wherein the mounting structure includes a first portion configured to attach the first neck to the chassis, and a second portion configured to attach the second neck to the chassis.

15. The vehicle of claim 14, wherein the first portion of the mounting structure inhibits longitudinal movement of the tank, and the second portion of the mounting structure facilitates longitudinal movement of the tank.

16. The vehicle of claim 15, wherein the first portion of the mounting structure includes a circumferential portion disposed around the first neck, and the second portion of the mounting structure includes a circumferential portion disposed around the second neck, the mounting structure being further configured to provide no circumferential attachment around the middle portion of the tank, thereby facilitating diametral movement of the tank.

17. The vehicle of claim 16, wherein the first and second portions of the mounting structure each include a pair of extension members laterally disposed from their respective circumferential portions, each of the extension members being attached to a portion of the chassis.

18. The vehicle of claim 17, wherein at least one of the extension members of each of the first and second portions of the mounting structure includes a flexible attachment to a respective portion of the chassis, thereby substantially isolating the tank from twisting and bending movements of the chassis.

19. The vehicle of claim 12, further comprising a rigid mounting structure for attaching the tank to the chassis such that the tank adds stiffness to the chassis.

* * * * *